(12) United States Patent
Du et al.

(10) Patent No.: US 7,685,409 B2
(45) Date of Patent: Mar. 23, 2010

(54) ON-DEMAND MULTI-THREAD MULTIMEDIA PROCESSOR

(75) Inventors: Yun Du, San Diego, CA (US); Guofang Jiao, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 11/677,362

(22) Filed: Feb. 21, 2007

(65) Prior Publication Data

US 2008/0201716 A1    Aug. 21, 2008

(51) Int. Cl.
*G06F 9/00* (2006.01)
(52) U.S. Cl. ...................................... 712/228
(58) Field of Classification Search .................. 712/228
See application file for complete search history.

(56) References Cited

U.S. PATENT DOCUMENTS

| | | | | | |
|---|---|---|---|---|---|
| 5,959,689 | A | * | 9/1999 | De Lange et al. | 348/571 |
| 6,041,400 | A | * | 3/2000 | Ozcelik et al. | 712/35 |
| 6,092,175 | A | | 7/2000 | Levy et al. | |
| 6,507,903 | B1 | * | 1/2003 | Beatty et al. | 711/173 |
| 2002/0095453 | A1 | * | 7/2002 | Steensgaard | 709/107 |

FOREIGN PATENT DOCUMENTS

GB    2404266    1/2005

WO    2006122102    11/2006

OTHER PUBLICATIONS

Kim, S et al., Fair Cache Sharing and Partitioning in a Chip Multi-processor Architecture, 2004, IEEE, Proceedings of the 13th Intl conf. on Parallel architecture and compilation techniques (PACT'04), 12 pages.*
Rashid, R. et al., Machine-Independent Virtual Memory Management for Paged Uniprocessor and Multiprocessor Architectures, 1988, IEEE transactions on computers vol. 37, No. 8., pp. 896-908.*

(Continued)

*Primary Examiner*—Eric Coleman
(74) *Attorney, Agent, or Firm*—Tim Loomis; Michael J. Dehaemer, Jr.

(57) ABSTRACT

A device includes a multimedia processor that can concurrently support multiple applications for various types of multimedia such as graphics, audio, video, camera, games, etc. The multimedia processor includes configurable storage resources to store instructions, data, and state information for the applications and assignable processing units to perform various types of processing for the applications. The configurable storage resources may include an instruction cache to store instructions for the applications, register banks to store data for the applications, context registers to store state information for threads of the applications, etc. The processing units may include an arithmetic logic unit (ALU) core, an elementary function core, a logic core, a texture sampler, a load control unit, a flow controller, etc. The multimedia processor allocates a configurable portion of the storage resources to each application and dynamically assigns the processing units to the applications as requested by these applications.

31 Claims, 10 Drawing Sheets

OTHER PUBLICATIONS

Olukotun, K. etal., The Case for a Single-Chip Multiprocessor, 1996, ACM pp. 2-11.*

Tullsen, D.M. etal., Simultaneous Multithreading: Maximizing On-Chip Paralellism, 1995, ACM, pp. 392-403.*

Guttag,K. etal., A Single-Chip Multiprocessor for Multimedia: The MVP, Nov. 1992, IEEE, pp. 53-64.*

Ekman, M. etal., TLB and Snoop Energy-Reduction using Virtual Caches in Low-Power-Multiprocessors, 2002, ACM, pp. 243-246.*

Sasaki, H., Multimedia Complex on a chip, 1996, IEEE, ISSCC96/Session 1/Plenary Session/Paper TA 1.1, pp. 16-19.*

Oehring, H etal., MPEG-2 video decompression on simultaneous multimedia processors, 1999, IEEE, 6 pages.*

Hennessy, J. L, et al.: "Computer architecture: a quantitative approach," 4th edition, pp. 172-179, 2006, Morgan Kaufmann, XP002486199.

Suh. E. et al.: "Dynamic Cache Partitioning for simultaneous multithreading systems" pp. 1-8. Internet Citation, [Online] XP007900333. Retrieved from the Internet URL: http://csg.lcs.mit.edu/pubs/memos/Memo-446/memo-446.pdf>.

International Search Report PCT/US2008/054620. International Search Authority-European Patent Office-Jul. 16, 2008.

Written Opinion-PCT/US2008/054620. International Search Authority-Jul. 16, 2008.

* cited by examiner

Physical Address Look-up Table 820

| Logical Tile Address | Physical Tile Address |
|---|---|
| 1 | 4 |
| 2 | 1 |
| 3 | i |
| 4 | S-2 |
| ... | ... |
| S | i+1 |

Logical Tile Look-up Table 810

| Application ID | First Logical Tile | Number of Logical Tiles |
|---|---|---|
| 1 | 1 | 2 |
| 2 | 3 | 4 |
| 3 | 7 | 8 |
| 4 | 15 | 4 |
| ... | ... | ... |
| N | S-1 | 2 |

*FIG. 8*

ON-DEMAND MULTI-THREAD MULTIMEDIA PROCESSOR

BACKGROUND

1. Field

The present disclosure relates generally to electronics, and more specifically to a processor.

2. Background

Processors are widely used for various purposes such as computing, communication, networking, etc. A processor may be a general-purpose processor such as a central processing unit (CPU) or a specialized processor such as a digital signal processor (DSP) or a graphics processing unit (GPU). A general-purpose processor may support a generic set of instructions and generic functions, which may be used by applications of various types. A general-purpose processor may be inefficient for certain applications with specific processing requirements. In contrast, a specialized processor may support a limited set of instructions and specialized functions, which may be customized for specific applications. This allows the specialized processor to efficiently support the applications for which it is designed. However, the range of applications supported by the specialized processor may be limited.

A device such as a cellular phone, a personal digital assistant (PDA), or a laptop computer may support applications of various types. It is desirable to execute these applications as efficiently as possible and with as little hardware as possible in order to reduce cost, power, etc.

SUMMARY

A device including a multimedia processor that can concurrently support multiple applications is described herein. These applications may be for various types of multimedia such as graphics, audio, video, camera, games, etc. The multimedia processor comprises configurable storage resources to store instructions, data, and state information for the applications and assignable processing units to perform various types of processing for the applications. The configurable storage resources may include an instruction cache to store instructions for the applications, register banks to store data for the applications, context registers to store state information for threads of the applications, etc. The processing units may include an arithmetic logic unit (ALU) core, an elementary function core, a logic core, a texture sampler, a load control unit, a flow controller, etc., which may operate as described below. The multimedia processor allocates a configurable portion of the storage resources to each application and dynamically assigns the processing units to the applications as requested by these applications. Each application thus observes an independent virtual processor and does not need to be aware of the other applications executing concurrently. The multimedia processor may further include an input interface unit to asynchronously receive threads from the applications, an output interface unit to asynchronously provide results to the applications, and a load control unit to fetch instructions and data for the applications, as needed, from a cache memory and/or a main memory.

The multimedia processor may determine loading based on the percentage of time the processing units are assigned to the applications. The multimedia processor may adjust clock speed based on the loading in order to reduce power consumption.

Various aspects and features of the disclosure are described in further detail below.

BRIEF DESCRIPTION OF THE DRAWINGS

FIG. 8 shows logical and physical look-up tables for the storage unit in FIG. 7.

DETAILED DESCRIPTION

Figure 1:
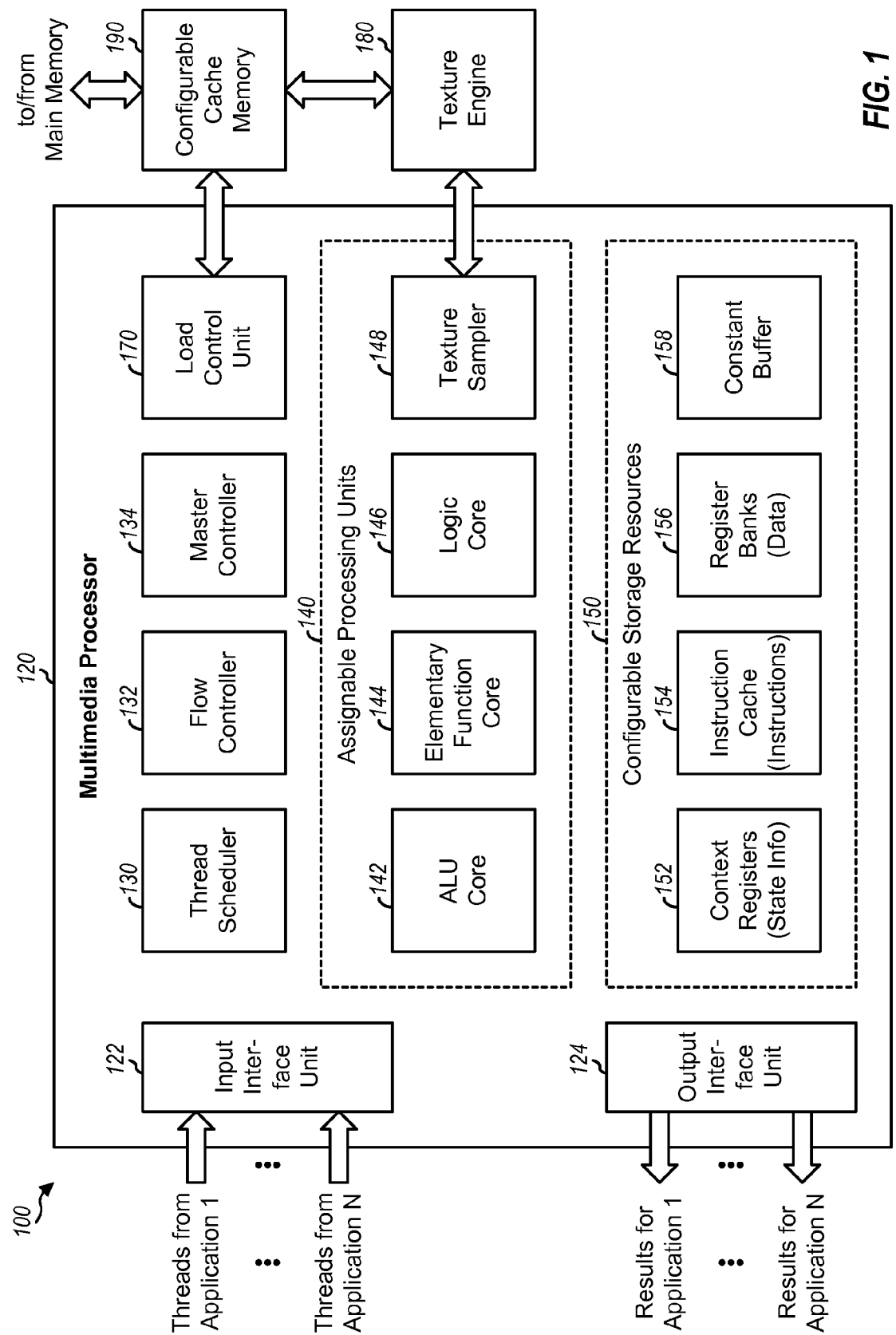
FIG. 1 shows a block diagram of a multimedia system.

FIG. 1 shows a block diagram of a multimedia system 100. System 100 may be a stand-alone system or part of a larger system such as a computing system (e.g., a laptop computer), a wireless communication device (e.g., a cellular phone), a game system (e.g., a game console), etc. System 100 supports N multimedia applications, which are referred to as applications 1 through N. In general, N may be any integer value. An application may also be referred to as a program, a software program, etc. A multimedia application may be for any type of multimedia such as graphics, audio, video, camera, games, etc. The applications may start and end at different times, and any number of applications may be executed in parallel at any given moment.

System 100 may support 2-dimensional (2-D) and/or 3-dimensional (3-D) graphics. A 2-D or 3-D image may be represented with polygons (typically triangles). Each triangle may be composed of picture elements (pixels). Each pixel may have various attributes such as space coordinates, color values, texture coordinates, etc. Each attribute may have up to four components. For example, space coordinates may be given by either three components x, y and z or four components x, y, z and w, where x and y are horizontal and vertical coordinates, z is depth, and w is a homogeneous coordinate. Color values may be given by three components r, g and b or four components r, g, b and a, where r is red, g is green, b is blue, and a is a transparency factor that determines the transparency of a pixel. Texture coordinates are typically given by horizontal and vertical coordinates, u and v. A pixel may also be associated with other attributes.

System 100 includes a multimedia processor 120, a texture engine 180, and a configurable cache memory 190. Multimedia processor 120 may perform various types of processing for multimedia applications, as described below. Texture engine 180 may perform graphics operations such as texture mapping, which is a complex graphics operation involving modification of the color of pixels with the color of a texture image. Cache memory 190 is a fast memory that can store instructions and data for multimedia processor 120 and texture engine 180. System 100 may include other units.

Multimedia processor 120 performs processing for the N applications. Multimedia processor 120 may split the processing of each application into a series of threads, e.g., automatically and transparent to the application. A thread (or thread of execution) may indicate a specific task that may be performed with a set of one or more instructions. Threads allow an application to have multiple tasks performed simultaneously by different units and further allow different applications to share processing and storage resources.

In the design shown in FIG. 1, multimedia processor 120 includes an input interface unit 122, an output interface unit 124, a thread scheduler 130, a flow controller 132, a master controller 134, assignable processing units 140, configurable storage resources 150, and a load control unit 170. Input interface unit 122 receives threads from the N applications and provides these threads to thread scheduler 130. Thread scheduler 130 performs various functions to schedule and manage execution of the threads, as described below. Flow controller 132 assists with application/program flow control. Master controller 134 receives information such as processing mode, data format, etc., and configures the operation of various units within multimedia processor 120 accordingly. For example, master controller 134 may decode command, set up state for applications, and control a state update sequence.

In the design shown in FIG. 1, assignable processing units 140 include an ALU core 142, an elementary function core 144, a logic core 146, and a texture sampler 148. A core generally refers to a processing unit within an integrated circuit. The terms "core", "engine", "machine", "processor", "processing unit", "hardware unit", etc., may be used interchangeably. In general, assignable processing units 140 may include any number of processing units and any type of processing unit. Each processing unit may operate independently of the other processing units.

ALU core 142 may perform arithmetic operations such as addition, subtraction, multiplication, multiply and accumulate, dot product, absolute, negation, comparison, saturation, etc. ALU core 142 may comprise one or more scalar ALUs and/or one or more vector ALUs. A scalar ALU can operate on one component at a time. A vector ALU can operate on multiple (e.g., four) components at a time. Elementary function core 144 may compute transcendental elementary functions such as sine, cosine, reciprocal, logarithm, exponential, square root, reciprocal square root, etc., which may be widely used by graphics applications. Elementary function core 144 may improve performance by computing the elementary functions in much less time than the time required to perform polynomial approximations of the elementary functions using simple instructions. Elementary function core 144 may comprise one or more elementary function units. Each elementary function unit may compute an elementary function for one component at a time.

Logic core 146 may perform logical operations (e.g., AND, OR, XOR, etc.), bitwise operations (e.g., left and right shifts), integer operations, comparison, data buffer management operations (e.g., push, pop, etc.), and/or other operations. Logic core 146 may also perform format conversion, e.g., from integers to floating point numbers, and vice versa. Texture sampler 148 may perform pre-processing for texture engine 180. For example, texture sampler 148 may read texture coordinates, attach code and/or other information, and send its output to texture engine 180. Texture sampler 148 may also provide instructions to texture engine 180 and receive results from the texture engine.

In the design shown in FIG. 1, configurable storage resources 150 include context registers 152, an instruction cache 154, register banks 156, and a constant buffer 158. In general, configurable storage resources 150 may include any number of storage units and any type of storage unit. Context registers 152 store state information or context for threads from the N applications. Instruction cache 154 stores instructions for the threads. These instructions indicate specific operations to perform for each thread. Each operation may be an arithmetic operation, an elementary function, a logic operation, a memory access operation, etc. Instruction cache 154 may be loaded with instructions from cache memory 190 and/or a main memory (not shown in FIG. 1), as needed, via load control unit 170. Register banks 156 store data for the applications as well as intermediate and final results from processing units 140. Constant buffer 158 stores constant values (e.g., scale factors, filter weights, etc.) used by processing units 140 (e.g., ALU core 142 and logic core 146).

Load control unit 170 may control the loading of instructions, data, and constants for the N applications. Load control unit 170 interfaces with cache memory 190 and loads instruction cache 154, register banks 156, and constant buffer 158 with instructions, data, and constants from cache memory 190. Load control unit 170 also writes the data and results in register banks 156 to cache memory 190. Output interface unit 124 receives the final results for the executed threads from register banks 156 and provides these results to the applications. Input interface unit 122 and output interface unit 124 may provide asynchronous interface to external units (e.g., camera, display unit, etc.) associated with the N applications.

FIG. 1 shows an example design of multimedia processor 120. In general, multimedia processor 120 may include any set of assignable processing units and any set of configurable storage resources. The configurable storage resources may store instructions, data, state information, etc., for the applications. The processing units may perform any type of processing for the applications. Flow controller 132 and load control unit 170 may also be considered as assignable processing units even though they are not included within units 140. Multimedia processor 120 may also include other processing, storage, and control units not shown in FIG. 1. Multimedia processor 120 may allocate a configurable portion of the storage resources to each application and dynamically assign the processing units to the applications as requested by these applications Multimedia processor 120 may implement one or more graphics application programming interfaces (APIs) such as Open Graphics Library (OpenGL), Direct3D, Open Vector Graphics (OpenVG), etc. These various graphics APIs are known in the art. Multimedia processor 120 may also support 2-D graphics, or 3-D graphics, or both.

Figure 2:
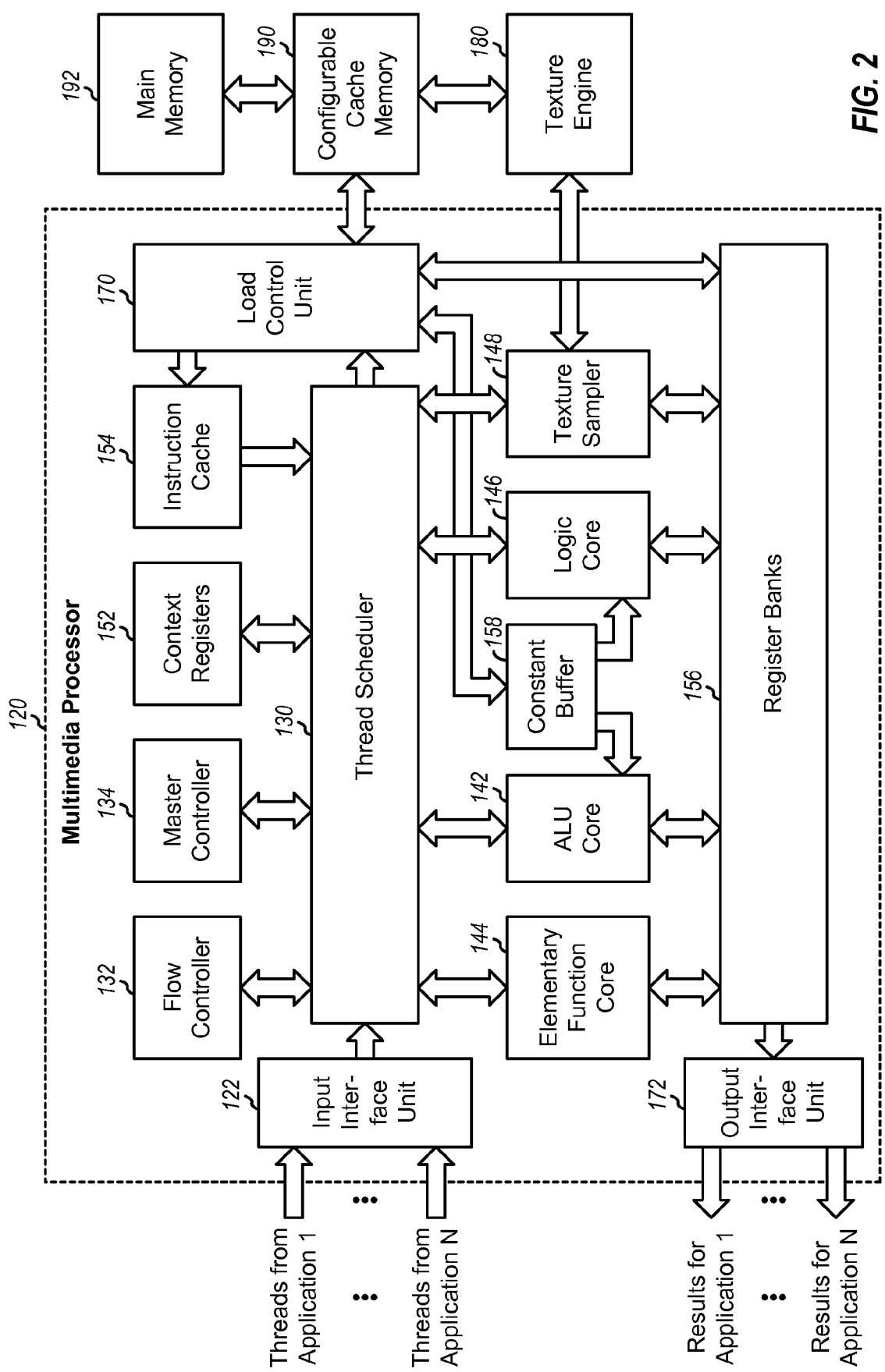
FIG. 2 shows a block diagram of a multimedia processor.

FIG. 2 shows a block diagram of a design of multimedia processor 120 in FIG. 1. In this design, thread scheduler 130 interfaces with ALU core 142, elementary function core 144, logic core 146, and texture sampler 148 within assignable processing units 140. Thread scheduler 130 further interfaces with input interface unit 122, flow controller 132, master controller 134, context registers 152, instruction cache 154, and load control unit 170. Register banks 156 interface with ALU core 142, elementary function core 144, logic core 146, and texture sampler 148 within assignable processing units 140, load control unit 170, and output interface unit 124. Load control unit 170 further interfaces with instruction cache 154, constant buffer 158, and cache memory 190. The various units within multimedia processor 120 may also interface with one another in other manners.

A main memory 192 may be part of system 100 or may be external to system 100. Main memory 192 is a large, slower memory located further away (e.g., off-chip) from multimedia processor 120. Main memory 192 may store all instructions and data for the N applications being executed by multimedia processor 120. The instructions and data in main memory 192 may be loaded into cache memory 190 when and as needed.

Multimedia processor 120 may be designed and operated such that it appears as an independent virtual processor to each application being executed. Each application may be assigned sufficient storage resources for instructions, data, constant, and state information. Each application may have its own individual state (e.g., program counter, data format, etc.), which may be maintained by multimedia processor 120. Each application may also be assigned processing units based on the instructions to be executed for that application. The N applications may execute simultaneously without interfering one another and without having to be aware of the other applications. Multimedia processor 120 may adjust the performance target for each application based on the application demand and/or other factors, e.g., priority.

Figure 3:
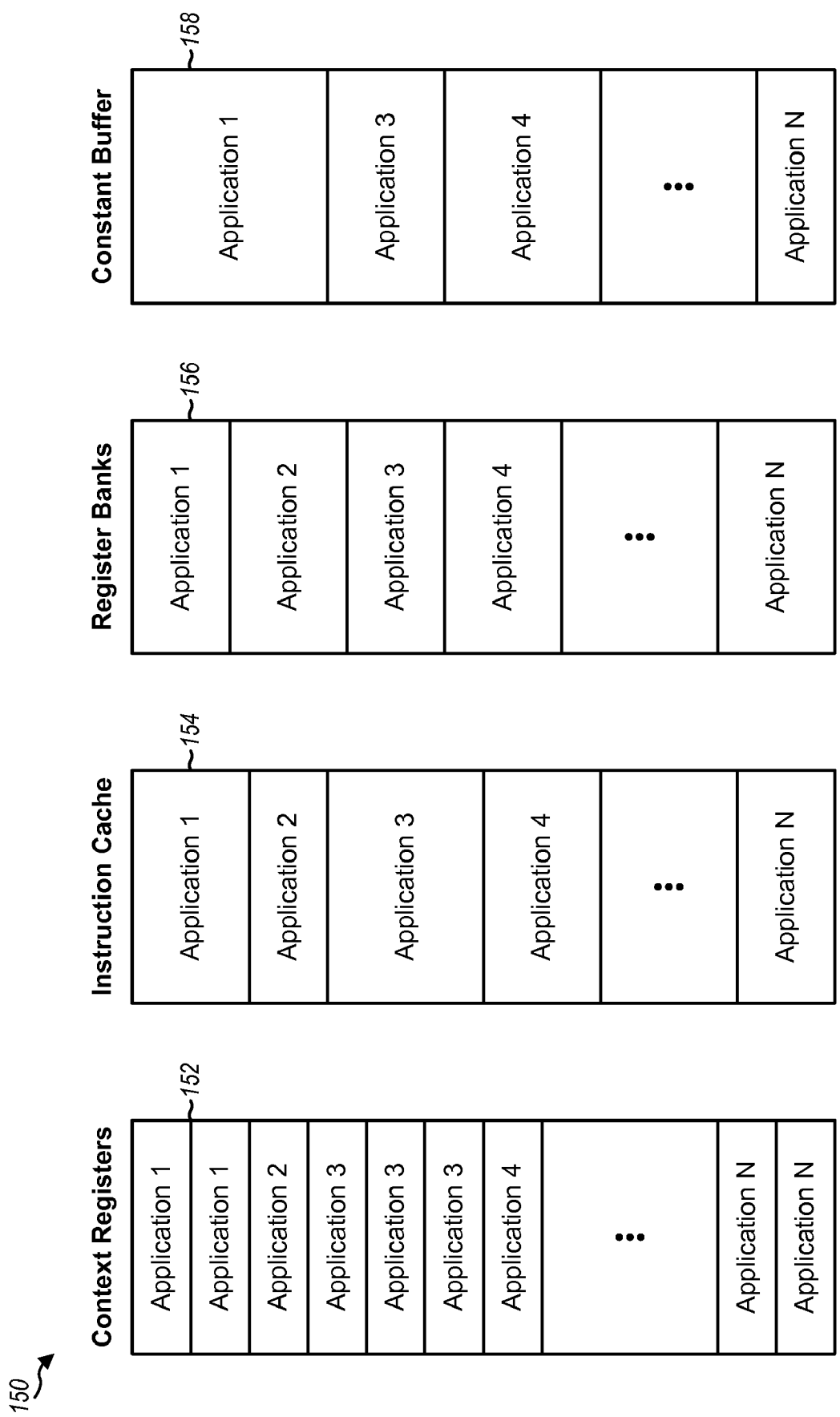
FIG. 3 shows allocation of storage resources to N applications.

FIG. 3 shows an example allocation of storage resources to the N applications. Each application may be allocated a portion of context registers 152, a portion of instruction cache 154, a portion of register banks 156, and a portion of constant buffer 158. For each storage unit, the portion allocated to a given application may be zero or non-zero depending on the storage requirements of that application.

Context registers 152 may be dynamically assigned to threads from the N applications and may store various types of information for the threads, as described below. Context registers 152 may be updated as threads are accepted, executed, and completed. Instruction cache 154 and register banks 156 may be allocated to each application at the start of execution, e.g., based on the requirements of the application. For each application, the allocated portions for instruction cache 154 and/or register banks 156 may change during the execution of the application based on its demand and other factors. Constant buffer 158 may store constants that may be used for any application. Constants for a given application may be loaded into constant buffer 158 when needed and may then be available for use by all applications.

The storage units may be designed to support flexible allocation of storage resources to the applications, as described below. The storage units may also be designed to simplify memory access by the applications, as also described below.

Figure 4:
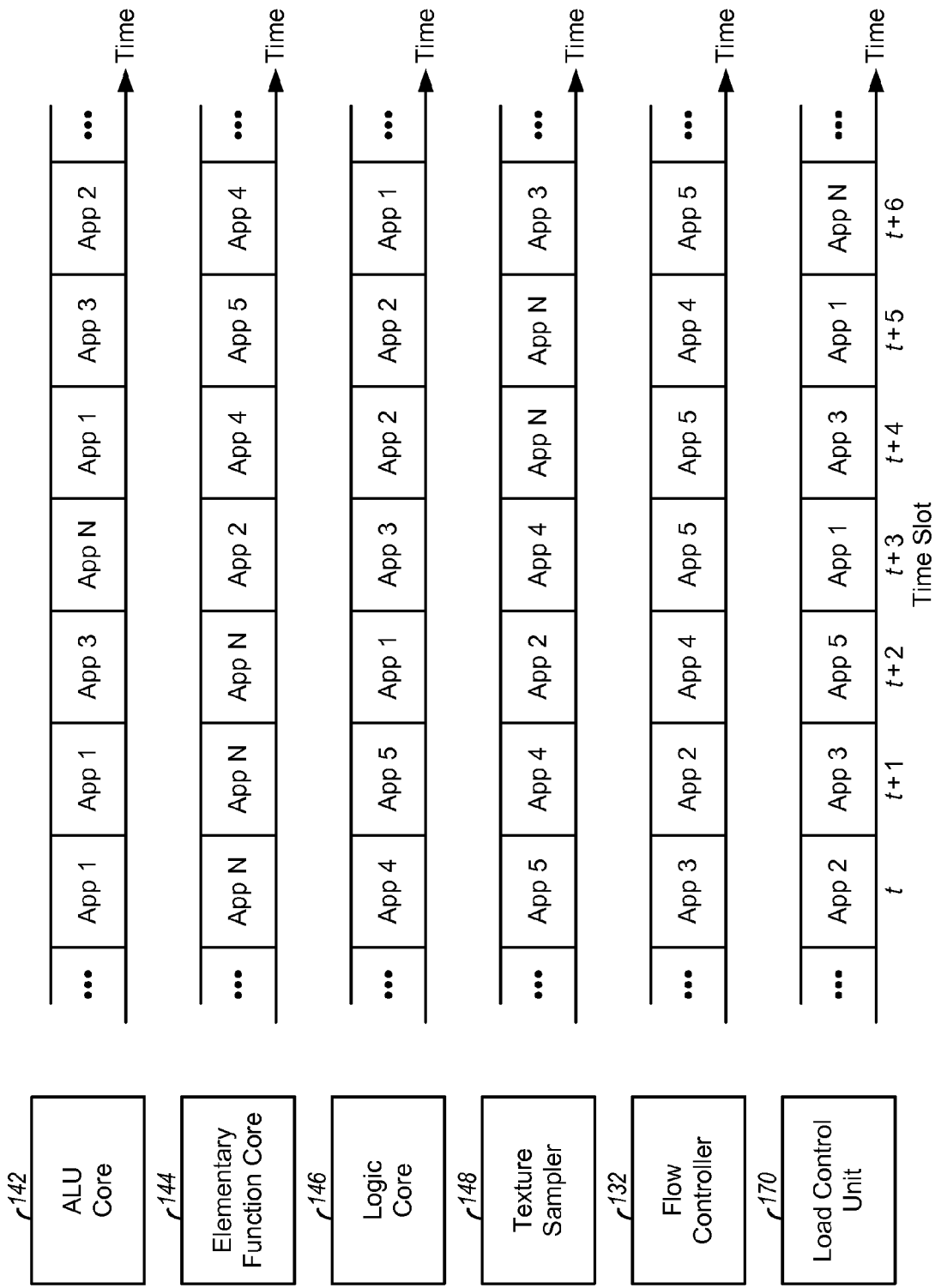
FIG. 4 shows assignment of processing units to the N applications.

FIG. 4 shows an example assignment of processing units to the N applications. A separate timeline may be maintained for each processing unit such as ALU core 142, elementary function core 144, logic core 146, texture sampler 148, flow controller 132, and load control unit 170. The timeline for each processing unit may be partitioned into time slots. A time slot is the smallest unit of time that may be allocated to an application and may correspond to one or more clock cycles. The processing units may have time slots of the same duration or different durations.

The time slots for ALU core 142 may be assigned to any of the applications. In the example shown in FIG. 4, ALU core 142 is assigned to application 1 (App 1) in time slots t and t+1, to application 3 in time slot t+2, application N in time slot t+3, etc. Likewise, the time slots for elementary function core 144, logic core 146, texture sampler 148, flow controller 132, and load control unit 170 may be assigned to any of the applications. Multimedia processor 120 may dynamically assign the processing units to the applications on-demand based on the processing requirements of these applications.

Figure 5:
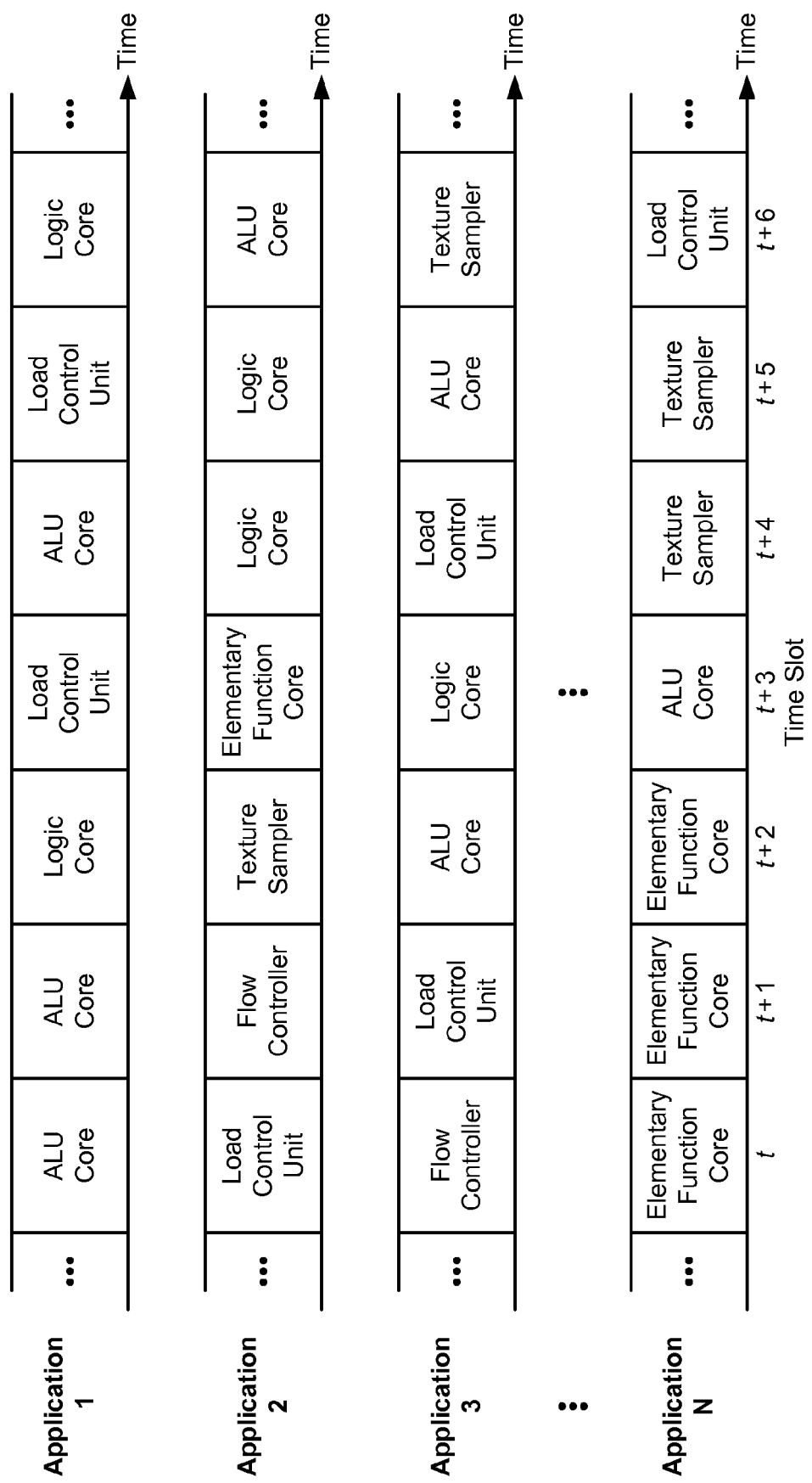
FIG. 5 shows a virtual processor for each of the N applications.

FIG. 5 shows a virtual processor for each of the N applications. Each application observes a virtual processor having all of the processing units used by that application. Each application may be assigned processing units based on the processing demand of that application, and the assigned processing units may be shown on a timeline for that application. In the example shown in FIG. 5, application 1 is assigned ALU core 142 in time slots t and t+1, then logic core 144 in time slot t+2, then load control unit 170 in time slot t+3, then ALU core 142 in time slot t+4, then load control unit 170 in time slot t+5, then logic core 144 in time slot t+6, etc. Application 1 does not use and is not assigned elementary function core 144, texture sampler 148, and flow controller 132 during the time slots shown in FIG. 5. Applications 2 through N are assigned processing units in different sequences.

As shown in FIG. 5, each application may be assigned pertinent processing units in multimedia processor 120. The particular processing units to assign to each application may change over time depending on the processing requirements. Each application does not need to be aware of the other applications nor the assignments of processing units to the other applications.

Multimedia processor 120 may support multi-threading to achieve parallel execution of instructions and improve overall efficiency. Multi-threading refers to the execution of multiple threads in parallel by different processing units. Thread scheduler 130 may accept threads from the N applications, determine which threads are ready for execution, and dispatch these threads to different processing units. Thread scheduler 130 may manage execution of the threads and utilization of the processing units.

Figure 6:
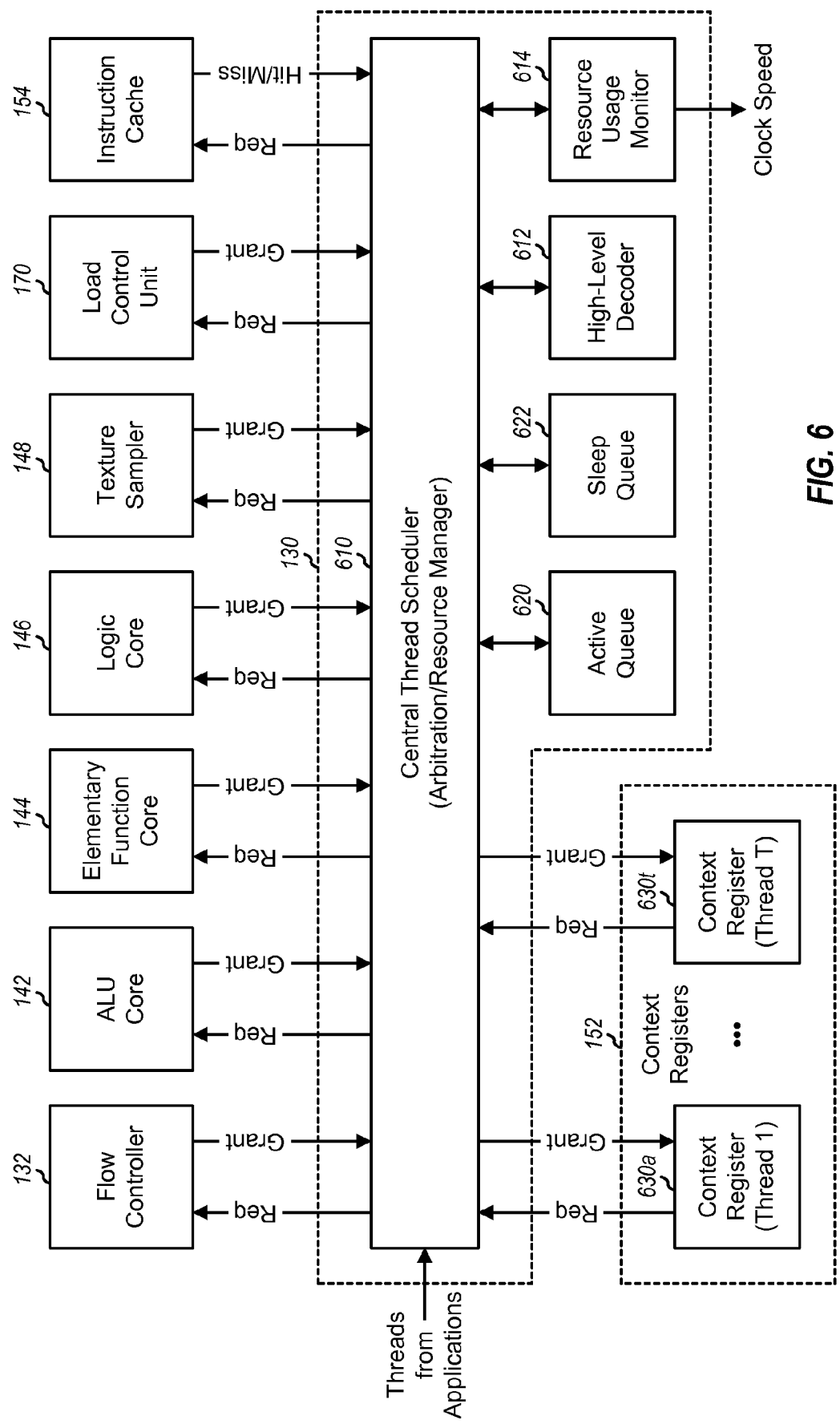
FIG. 6 shows a block diagram of a thread scheduler.

FIG. 6 shows a block diagram of a design of thread scheduler 130 in FIGS. 1 and 2. In this design, thread scheduler 130 includes a central thread scheduler 610, a high-level decoder 612, a resource usage monitor unit 614, an active queue 620, and a sleep queue 622. Context registers 152 include T context registers 630a through 630t for T threads, where T may be any value.

Central thread scheduler 610 may communicate with processing units 132, 142, 144, 146, 148 and 170 and context registers 630a through 630t via request (Req) and grant interfaces. Scheduler 610 may issue requests to instruction cache 154 and receive hit/miss indications in response. In general, the communication between these units may be achieved with various mechanisms such as control signals, interrupts, messages, registers, etc.

Central thread scheduler 610 may perform various functions to schedule threads. Central thread scheduler 610 may determine whether to accept new threads from the N applications, dispatch threads that are for execution, and release/remove threads that are completed. For each thread, central thread scheduler 610 may determine whether resources (e.g., instructions, processing units, register banks, etc.) required by that thread are available, activate the thread and place it in active queue 620 if the required resources are available, and place the thread in sleep queue 622 if any resource is not available. Active queue 620 stores threads that are ready for execution, and sleep queue 622 stores threads that are not ready for execution.

Central thread scheduler 610 may also manage execution of threads. In each scheduling interval (e.g., each time slot), central thread scheduler 610 may select a number of candidate threads in active queue 620 for evaluation and possible dispatch. Central thread scheduler 610 may determine the processing units to use for the candidate threads, check for read/write conflicts of storage units, and dispatch different threads to different processing units for execution. Multimedia processor 120 may support execution of M threads concurrently, where M may be any suitable value (e.g., M=12). In general, M may be selected based on the size of the storage resources (e.g., instruction cache 154 and register banks 156), the latency or delay for load operations, the pipelines of the processing units, and/or other factors so that the processing units are utilized as fully as possible.

Central thread scheduler 610 may update the status and state of threads as appropriate. Central thread scheduler 610 may place a thread in sleep queue 622 if (a) the next instruction for the thread is not found in instruction cache 154, (b) the next instruction is waiting for results from a previous instruction, or (c) some other sleep conditions are satisfied. Central thread scheduler 610 may move a thread from sleep queue 622 to active queue 620 when the sleep conditions are no longer true.

Central thread scheduler 610 may maintain a program counter for each thread and may update the program counter as instructions are executed or program flow is altered. Scheduler 610 may solicit assistance from flow controller 132 to control the program flow for the threads.

Flow controller 132 may handle if/else statements, loops, subroutine calls, branches, switch instructions, pixel kill and/or other flow altering instructions. Flow controller 132 may evaluate one or more conditions for each such instruction, indicate a change in the program counter one way if the condition(s) are met, and indicate a change in the program counter another way if the condition(s) are not met. Flow controller 132 may also perform other functions related to dynamic program flow. Central thread scheduler 610 may update the program counter based on results from flow controller 132.

Central thread scheduler 610 may also manage context registers 152 and update these registers as threads are accepted, executed, and completed. Context registers 152 may store various types of information for threads. For example, a context register 630 for a thread may store (1) an application/program identifier (ID) for the application to which the thread belongs, (2) a program counter that points to the current instruction for the thread, (3) a coverage mask that indicates valid and invalid pixels for the thread, (4) an active flag that indicates which pixels to operate on in case of a flow altering instruction, (5) a resume instruction pointer that indicates when a pixel will be re-activated if it is inactive, (6) a stack that stores return instruction pointers for dynamic flow control, (7) address registers for relative addressing, (8) predicate registers that store condition calculation results, (9) a load reference counter that tracks load requests and data back conditions, and/or (10) other information. Context registers 152 may also store less, more, or different information.

Multimedia processor 120 may support a comprehensive set of instructions for various multimedia applications. This instruction set may include arithmetic, elementary function, logical, bitwise, flow control, and other instructions.

Two-level decoding of instructions may be performed to improve performance. High-level decoder 612 may perform high-level decoding of instructions to determine instruction type, operand type, source and destination identifiers (IDs), and/or other information used for scheduling. Each processing unit may include a separate instruction decoder that performs low-level decoding of instructions for that processing unit. For example, an instruction decoder for ALU core 142 may handle only ALU-related instructions, an instruction decoder for elementary function core 144 may handle only instructions for elementary functions, etc. Two-level decoding may simplify the design of central thread scheduler 610 as well as the instruction decoders for the processing units.

Resource usage monitor unit 614 monitors the usage of the processing units, e.g., by keeping track of the percentage of time each processing unit is assigned. Monitor unit 614 may dynamically adjust the operation of the processing units in order to conserve battery power while providing the desired performance. For example, monitor unit 614 may adjust the clock speed for multimedia processor 120 based on loading of the multimedia processor in order to reduce power consumption. Monitor unit 614 may also adjust the clock speed for each individual processing unit based on loading or percentage utilization of that processing unit. Monitor unit 614 may select the highest clock speed for full loading and may select progressively slower clock speed for progressively less loading. Monitor unit 614 may also disable/power down any processing unit that is not assigned to any application and may enable/power up the processing unit when it is assigned.

Each thread may be packet based and may operate on a unit of data of up to a predetermined size. The data unit size may be selected based on the design of the processing and storage units, the characteristics of the data being processed, etc. In one design, each thread operates on up to four pixels or up to four vertices in an image. Register banks 156 may include four register banks that may store (a) up to four components of each attribute for pixels, one component per register bank, or (b) components of attributes for pixels, one pixel per register bank. ALU core 142 may include four scalar ALUs or a vector ALU that can operate on up to four components at a time.

A storage unit (e.g., instruction cache 154 or register banks 156) may be implemented with a virtual memory architecture that allows for efficient allocation of storage resources to the applications and easy access of the allocated storage resources by the applications. The virtual memory architecture may utilize a virtual memory and a physical memory. Applications may be allocated sections of the virtual memory and may perform memory access via virtual address space. Different sections of the virtual memory may be mapped to different sections of the physical memory, which stores the instructions and/or data.

Figure 7:
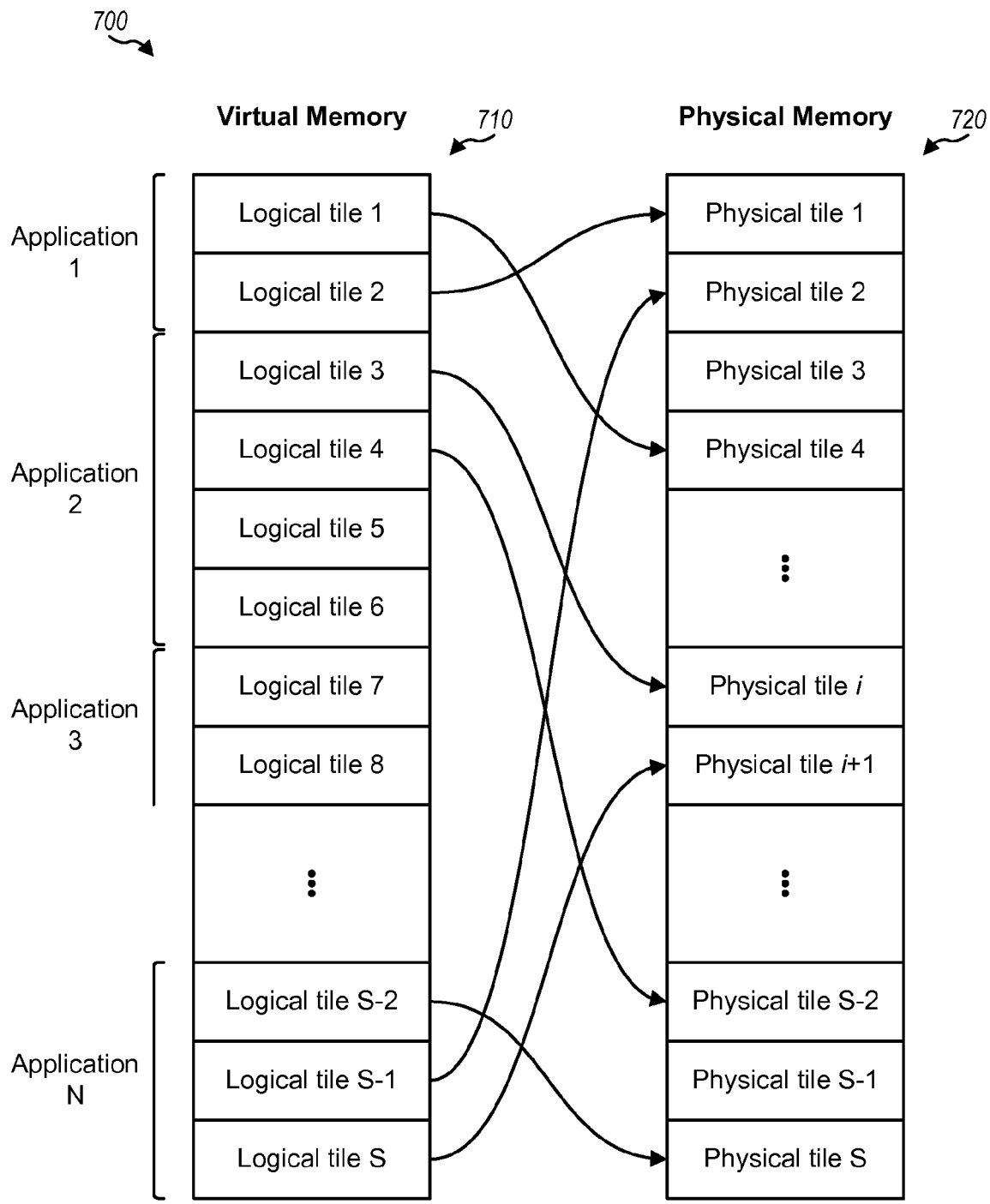
FIG. 7 shows a design of a storage unit with a virtual memory architecture.

FIG. 7 shows a design of a storage unit 700 with a virtual memory architecture. Storage unit 700 may be used for instruction cache 154, register banks 156, etc. In this design, storage unit 700 appears as a virtual memory 710 to the applications. Virtual memory 710 may be partitioned into multiple (S) logical tiles or sections, which are referred to as logical tiles 1 through S. In general, S may be any integer value equal to or greater than N. The S tiles may have the same size or different sizes. Each application may be allocated any number of consecutive logical tiles based on that application's memory usage and the available tiles. In the example shown in FIG. 7, application 1 is allocated logical tiles 1 and 2, application 2 is allocated logical tiles 3 through 6, etc.

Storage unit 700 implements a physical memory 720 that stores instructions and/or data for the applications. Physical memory 720 includes S physical tiles 1 through S. Each logical tile of virtual memory 710 is mapped to one physical tile of physical memory 720. An example mapping for some logical tiles is shown in FIG. 7. In this example, physical tile 1 stores instructions and/or data for logical tile 2, physical tile 2 stores instructions and/or data for logical tile S-1, etc.

The use of logical tiles and physical tiles may simplify the allocation of tiles to applications and the management of the tiles. An application may request certain amounts of storage resources for instructions and data. Multimedia processor 120 may allocate one or more tiles in instruction cache 154 and one or more tiles in register banks 156 to the application. The application may be allocated additional, fewer, or different logical tiles as necessary.

FIG. 8 shows a design of a logical tile look-up table (LUT) 810 and a physical address look-up table 820 for storage unit 700 in FIG. 7. In this design, logical tile look-up table 810 includes N entries for the N applications, one entry for each application. The N entries may be indexed by the application ID. The entry for each application includes a field for the first logical tile allocated to the application and another field for the number of logical tiles allocated to the application. In the example shown in FIG. 8, application 1 is allocated two logical tiles starting with logical tile 1, application 2 is allocated four logical tiles starting with logical tile 3, application 3 is allocated eight logical tiles starting with logical tile 7, etc. Each application may be allocated consecutive logical tiles to simplify the generation of addresses for memory access. However, the applications may be allocated logical tiles in any order, e.g., logical tile 1 may be allocated to any application.

In the design shown in FIG. 8, physical address look-up table 820 includes S entries for the S logical tiles, one entry for each logical tile. The S entries of table 820 may be indexed by logical tile address. The entry for each logical tile indicates the physical tile to which that logical tile is mapped. In the example shown in FIGS. 7 and 8, logical tile 1 is mapped to physical tile 4, logical tile 2 is mapped to physical tile 1, logical tile 3 is mapped to physical tile i, logical tile 4 is mapped to physical tile S-2, etc. Look-up tables 810 and 820 may be updated whenever an application is allocated additional, fewer, and/or different logical tiles. The applications may be allocated different amounts of storage resources by simply updating the look-up tables, without having to actually transfer instructions or data among the physical tiles.

A storage unit may thus be associated with a virtual memory and a physical memory. Each application may be allocated a configurable portion of the virtual memory. At least one table may be used to map the portion of the virtual memory allocated to each application to a corresponding portion of the physical memory.

Each application is typically allocated limited amounts of storage resources in instruction cache 154 and register banks 156 to store instructions and data, respectively, for that application. Cache memory 190 may store additional instructions and data for the applications. Whenever an instruction for an application is not available in instruction cache 154, a cache miss may be returned to thread scheduler 130, which may then issue an instruction request to load control unit 170. Similarly, whenever data for an application is not available in register banks 156 or whenever a storage unit overflows with data, a data request may be issued to load control unit 170.

Load control unit 170 may receive instruction requests from thread scheduler 130 and data requests from other units. Load control unit 170 may arbitrate these various requests and generate memory requests to (a) load the desired instructions and/or data from cache memory 190 or main memory 192 and/or (b) write data to cache memory 190 or main memory 192.

The storage units within multimedia processor 120 may store small portions of instructions and data that are currently used for the applications. Cache memory 190 may store larger portions of instructions and data that might be used for the applications. Multimedia processor 120 may support unlimited instruction and data access via cache memory 190. This capability allows multimedia processor 120 to support applications of any size. Multimedia processor 120 may also support generic memory load and texture load between cache memory 190 and main memory 192.

Figure 9:
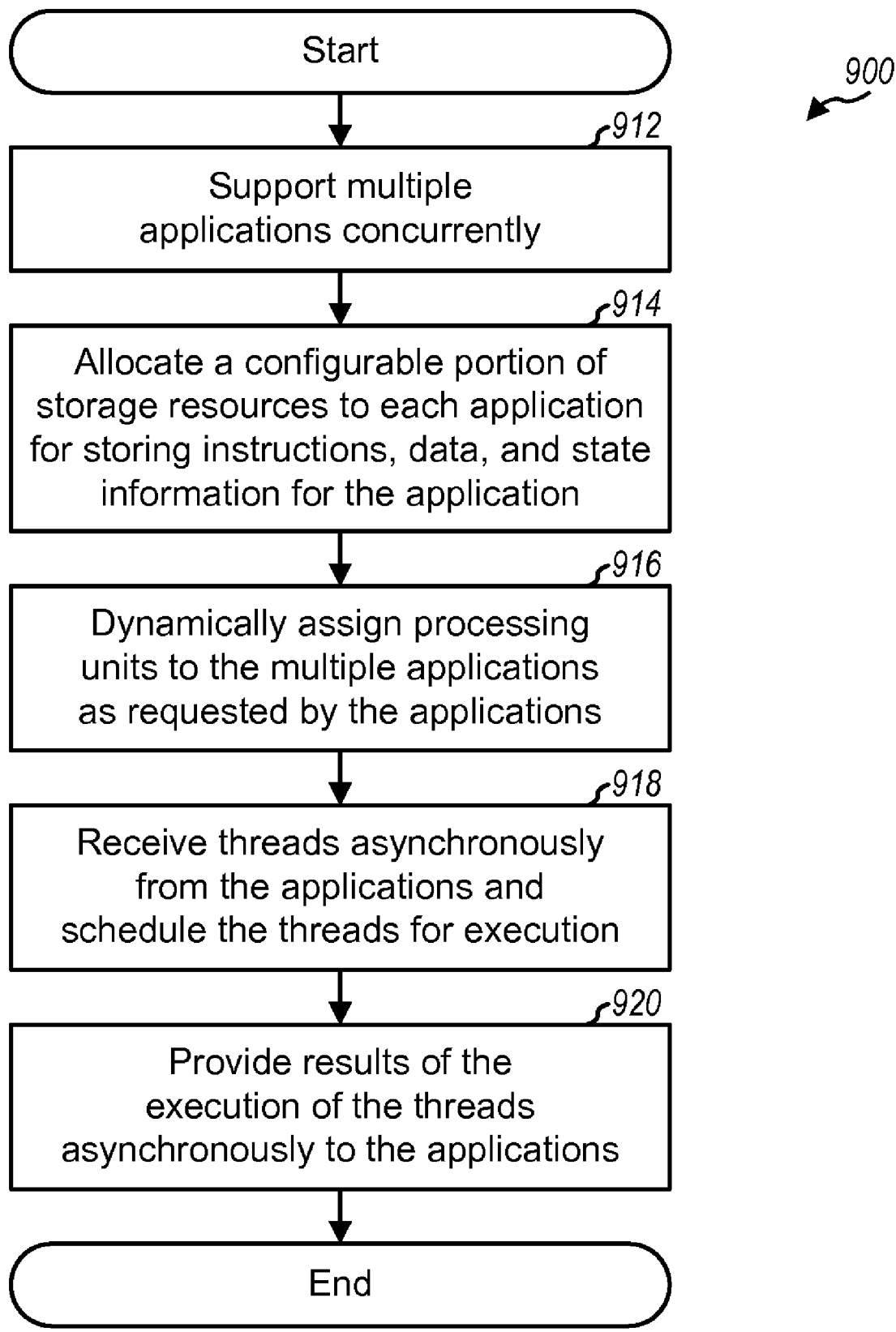
FIG. 9 shows a process for supporting multimedia applications.

FIG. 9 shows a process 900 for supporting multimedia applications. Multiple applications are supported concurrently, e.g., by a multimedia processor (block 912). A configurable portion of storage resources is allocated to each application for storing instructions, data, and state information for the application (block 914). For block 914, each application may be allocated a configurable portion of an instruction cache to store instructions for the application, a configurable portion of register banks to store data for the application, one or more context registers to store state information for the application, etc. Processing units are dynamically assigned to the applications as requested by these applications (block 916). Threads may be received asynchronously from the applications and scheduled for execution (block 918). Results of the execution of the threads may be provided asynchronously to the applications (block 920).

The multimedia processor described herein may be used for wireless communication devices, handheld devices, game devices, computing devices, consumer electronics devices, computers, etc. An exemplary use of the multimedia processor for a wireless communication device is described below.

Figure 10:
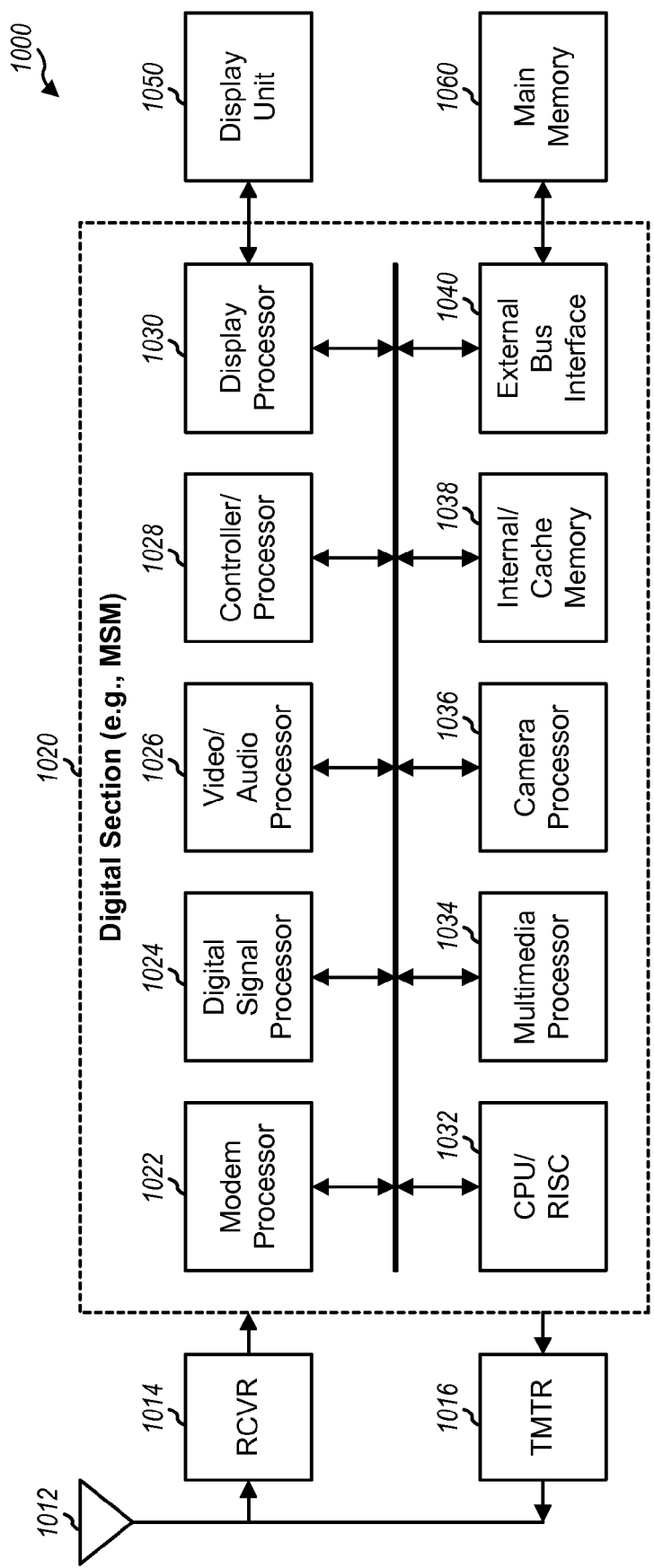
FIG. 10 shows a block diagram of a wireless communication device.

FIG. 10 shows a block diagram of a design of a wireless communication device 1000 in a wireless communication system. Wireless device 1000 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 1000 is capable of providing bi-directional communication via a receive path and a transmit path. On the receive path, signals transmitted by base stations are received by an antenna 1012 and provided to a receiver (RCVR) 1014. Receiver 1014 conditions and digitizes the received signal and provides samples to a digital section 1020 for further processing. On the transmit path, a transmitter (TMTR) 1016 receives data to be transmitted from digital section 1020, processes and conditions the data, and generates a modulated signal, which is transmitted via antenna 1012 to the base stations.

Digital section 1020 includes various processing, interface and memory units such as, for example, a modem processor 1022, a digital signal processor (DSP) 1024, a video/audio processor 1026, a controller/processor 1028, a display processor 1030, a central processing unit (CPU)/reduced instruction set computer (RISC) 1032, a multimedia processor 1034, a camera processor 1036, an internal/cache memory 1038, and an external bus interface (EBI) 1040. Modem processor 1022 performs processing for data transmission and reception (e.g., encoding, modulation, demodulation, and decoding). DSP 1024 may perform specialized processing for wireless device 1000. Video/audio processor 1026 performs processing on video content (e.g., still images, moving videos, and moving texts) for video applications such as camcorder, video playback, and video conferencing. Video/audio processor 1026 also performs processing for audio content (e.g., synthesized audio) for audio applications. Controller/processor 1028 may direct the operation of various units within digital section 1020. Display processor 1030 performs processing to facilitate the display of videos, graphics, and texts on a display unit 1050. CPU/RISC 1032 may perform general-purpose processing for wireless device 1000. Multimedia processor 1034 performs processing for multimedia applications and may be implemented as described above for FIGS. 1 through 8. Camera processor 1036 performs processing for a camera (not shown in FIG. 10). Internal/cache memory 1038 stores data and/or instructions for various units within digital section 1020 and may implement cache memory 190 in FIGS. 1 and 2. EBI 1040 facilitates transfer of data between digital section 1020 (e.g., internal/cache memory 1038) and a main memory 1060. Multimedia applications may be executed for any of the processors in digital section 1020.

Digital section 1020 may be implemented with one or more processors, micro-processors, DSPs, RISCs, etc. Digital section 1020 may also be fabricated on one or more application specific integrated circuits (ASICs) and/or some other type of integrated circuits (ICs).

The multimedia processor described herein may be implemented in various hardware devices. For example, the multimedia processor may be implemented within ASICs, DSPs, digital signal processing devices (DSPDs), programmable logic devices (PLDs), field programmable gate arrays (FPGAs), processors, controllers, micro-controllers, microprocessors, electronic devices, other electronic units. The multimedia processor may or may not include integrated/embedded memory.

An apparatus implementing the multimedia processor described herein may be a stand-alone unit or may be part of a device. The device may be (i) a stand-alone IC, (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A device including a multimedia processor to concurrently support multiple multimedia applications, the multimedia processor comprising:
    configurable storage resources to store instructions, data, and state information for the multiple multimedia applications; and
    assignable processing units to perform processing for the multiple multimedia applications, wherein the multimedia processor allocates a configurable portion of the storage resources to each multimedia application and dynamically assigns the processing units to the multiple multimedia applications as requested by the multimedia applications, wherein the assignable processing units comprise different processing units that perform different types of processing for the multiple multimedia applications, wherein the assignable processing units comprise at least one arithmetic logic unit (ALU) core, at least one elementary function core, at least one logic core, and at least one texture sampler.

2. The device of claim 1, wherein the configurable storage resources comprise an instruction cache to store instructions tor the multiple multimedia applications, wherein each multimedia application is allocated a configurable portion of the instruction cache.

3. The device of claim 1, wherein the configurable storage resources comprise register banks to store data for the multiple multimedia applications, wherein each multimedia application is allocated a configurable portion of the register banks.

4. The device of claim 1, wherein the configurable storage resources comprise
    a storage unit to store instructions or data for the multiple multimedia applications, the storage unit being associated with a virtual memory and a physical memory, wherein each multimedia application is allocated a configurable portion of the virtual mentor, and
    at least one table to map the portion of the virtual memory allocated to each multimedia application to a corresponding portion of the physical memory.

5. The device of claim 1, wherein the multimedia processor further comprises:
    a load control unit to fetch instructions and data for each multimedia application, as requested) from cache memory or a main memory for storage in the portion of the storage resources allocated to the multimedia application.

6. The device of: claim 1, wherein the processing units operate independently and each processing unit is assignable to any one of the multiple multimedia applications in a given tame slot.

7. The device of claim 1, wherein the multimedia processor powers down processing units not assigned to any one of the multiple multimedia applications.

8. The device of claim 1, wherein the processing units comprise at least one of an arithmetic logic unit (ALU) core, an elementary function core, a logic core, a texture sampler, a load control unit, and a flow controller.

9. The device of claim 1, wherein the multimedia processor further comprises:
    an input interface unit to asynchronously receive threads from the multiple multimedia applications; and
    an output interface unit to asynchronously provide results to the multiple multimedia applications.

10. The device of claim 1, wherein the multimedia processor adjusts clock speed based on loading of the multimedia processor to reduce power consumption.

11. The device of claim 10, wherein the multimedia processor determines the loading based on percentage of time the processing units are assigned in a particular time period.

12. The device of claim 1, wherein the multimedia processor concurrently supports a plurality of threads for the multiple multimedia applications.

13. The device of claim 12, wherein the configurable storage resources comprises
    a plurality of context registers for the plurality of threads, each context register storing state information for an associated thread.

14. The device of claim 13, wherein the state information for each thread comprises at least one of a program counter, a stack to store pointers for dynamic flow control, address registers for relative addressing, predicate registers to store condition calculation results, and a load reference counter to track load requests and data back conditions.

15. The device of claim 12, wherein each thread operates on a unit of data of up to a predetermined size.

16. The device of claim 12, wherein each thread operates on up to four pixels or up to four vertices in an image.

17. The device of claim 1, wherein the multimedia processor supports a single set of instructions applicable for the multiple multimedia applications.

18. The device of claim 1, wherein the multiple multimedia applications comprise at least one of a graphics application, an audio application, a video application, a camera application, and a game application.

19. A method comprising:
    concurrently supporting multiple multimedia applications;
    allocating a configurable portion of storage resources to each multimedia application for storing instructions, data, and state information for the multimedia application; and
    dynamically assigning processing units to the multiple multimedia applications as requested by the multimedia applications, wherein the processing units comprise different processing units that perform different types of processing for the multiple multimedia applications, wherein the processing units comprise at least one arithmetic logic unit (ALU) core, at least one elementary function core, at least one logic core, and at least one texture sampler.

20. The method of claim 19, wherein the allocating comprises allocating a configurable portion of an instruction cache to each multimedia a to store instructions for the multimedia application.

21. The method of claim 19, wherein the allocating comprises allocating a configurable portion of register banks to each multimedia application to store data for the multimedia application.

22. The method of claim 19,further comprising:

asynchronously receiving threads from the multiple multimedia applications; and asynchronously providing results to the multiple multimedia applications.

23. An apparatus comprising:

means for concurrently supporting multiple multimedia applications;

means for allocating a configurable portion of storage resources to each multimedia application for storing instructions, data, and state information for the multimedia application; and means for dynamically assigning processing units to the multiple multimedia applications as requested by the multimedia applications, wherein the processing units comprise different processing units that perform different types of processing for the multiple multimedia applications, wherein the processing units comprise at least one arithmetic logic unit (ALU) core, at least one elementary function core, least cue logic core, and at least one texture sampler.

24. The apparatus of claim 23, wherein the means for allocating comprises means for allocating a configurable portion of an instruction cache to each multimedia application to store instructions for the multimedia application.

25. The apparatus of claim 23, wherein the means for allocating comprises means for allocating a configurable portion of register banks to each multimedia application to store data for the multimedia application.

26. The apparatus of claim 23 further comprising:

means for asynchronously receiving threads from the multiple multimedia applications; and means for asynchronously providing results to the multiple multimedia applications.

27. A wireless device comprising:

a multimedia processor to concurrently support multiple multimedia applications, the multimedia processor comprising configurable storage resources to store instructions, data, and state information for the multiple multimedia applications, and assignable processing units to perform processing for the multiple multimedia applications, wherein the multimedia processor allocates a configurable portion of the storage resources to each multimedia application and dynamically assigns the processing units to the multiple multimedia applications as requested by the multimedia applications, wherein the assignable processing units comprise different processing units that perform different types of processing for the multiple multimedia applications; and a cache memory to store instructions and data for loading to the storage resources, wherein the assignable processing units comprise at least one arithmetic logic unit (ALU) core, at least one elementary function core, at least one logic core, and at least one texture sampler.

28. The device of claim 1, wherein the ALU core performs arithmetic operations, wherein the elementary function core computes transcendental elementary functions without performing polynomial approximation, wherein the logic core performs logical operations, bit-wise operations, and data buffer management operations, and wherein the texture sampler performs pre-processing fir a texture engine.

29. The method of claim 19, wherein the ALU core performs arithmetic operations, wherein the elementary function core computes transcendental elementary functions without performing polynomial approximations, wherein the logic core performs logical operations, bit-wise operations, and data buffer management operations, and wherein the texture sampler performs pre-processing for a texture engine.

30. The apparatus claim 23, wherein the ALU core performs arithmetic operations, wherein the elementary function core computes transcendental elementary functions without performing polynomial approximations, wherein the logic core performs logical operations, bit-wise operations, and data buffer management operations, and wherein the texture sampler performs pre-processing for a texture engine.

31. The wireless device of claim 27, wherein the ALU core performs arithmetic operations, wherein the elementary function core computes transcendental elementary functions without performing polynomial approximations, wherein the logic core performs logical operations, bit-wise operations, and data buffer management operations, and wherein the texture sampler performs pre-processing for a texture engine.

* * * * *

UNITED STATES PATENT AND TRADEMARK OFFICE
CERTIFICATE OF CORRECTION

| | | |
|---|---|---|
| PATENT NO. | : 7,685,409 B2 | Page 1 of 1 |
| APPLICATION NO. | : 11/677362 | |
| DATED | : March 23, 2010 | |
| INVENTOR(S) | : Du et al. | |

It is certified that error appears in the above-identified patent and that said Letters Patent is hereby corrected as shown below:

Column 11, line 53, claim 2: "tor" to read as --for--

Column 11, line 67, claim 4: "virtual mentor," to read as --virtual memory,--

Column 12, line 7, claim 5: "as requested)" to read as --as requested,--

Column 12, line 7, claim 5: "cache" to read as --a cache--

Column 12, line 11, claim 6: "of: claim 1," to read as --of claim 1,--

Signed and Sealed this
Twelfth Day of July, 2011

David J. Kappos
*Director of the United States Patent and Trademark Office*